United States Patent Office 3,332,960
Patented July 25, 1967

3,332,960
BASIC BISARYLSULFIDES
Lincoln Harvey Werner, Summit, N.J., assignor to Ciba Corporation, New York, N.Y., a corporation of Delaware
No Drawing. Filed Apr. 27, 1964, Ser. No. 363,001
5 Claims. (Cl. 260—309.6)

The present invention concerns bis-aryl-sulfides. More particularly, it relates to compounds of the formula $Ar_1$—X—$Ar_2$, in which X is thio of the formula —S—, sulfinyl of the formula —SO—, or sulfonyl of the formula —$SO_2$—, and each of the groups $Ar_1$ and $Ar_2$ is monocyclic carbocyclic aryl substituted by R-methoxy, in which R is a 1,3-diaza-2-cycloalken-2-yl group of five to seven ring members, or salts of such compounds, as well as process for the preparation of such compounds. The above compounds are more especially represented by the formula Ar—X—Ar, in which X has the above-given meaning, and each of the groups Ar is monocyclic carbocyclic aryl substituted by R-methoxy, in which R has the previously-given meaning.

The monocyclic carbocyclic aryl groups $Ar_1$ and $Ar_2$ have preferably one R-methoxy group, but may have more than one; usually an R-methoxy group substitutes the 4-position of the monocyclic carbocyclic aryl group.

The group R in an R-methoxy substituent, which is a 2-1,3-diaza-2-cycloalken-2-yl radical of five to seven ring members, is more particularly a 2-imidazolin-2-yl radical, but may also be a 1,4,5,6-tetrahydro-pyrimidin-2-yl or a 1,3-diaza-2-cyclohepten-2-yl radical. The carbon atoms of the 1,3-aza-2-cycloalken-2-yl radical available for substitution, as well as one of its aza-nitrogen ring members, may be substituted, for example, by lower alkyl, e.g. methyl, ethyl, n-propyl, isopropyl, n-butyl, tertiary butyl and the like.

The 1,3-diaza-2-cycloalken-2-yl radical may be represented by the partial formula:

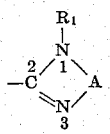

in which $R_1$ is hydrogen or lower alkyl, and A is lower alkylene separating the two nitrogen atoms by two to four carbon atoms. The latter may be represented above all by 1,2-ethylene, but may also be 1-methyl-1,2-ethylene, 1,1-dimethyl-1,2-ethylene, 1,2-dimethyl-1,2-ethylene, 1,3-propylene, 1-methyl-1,3-propylene, 2,2-dimethyl-1,3-propylene, 1,3-dimethyl-1,3-propylene, 1-ethyl-1,3-propylene, 1,4-butylene, 1-methyl-1,4-butylene and the like.

The two monocyclic carbocyclic aryl groups substituted by R-methoxy may be otherwise unsubstituted or may contain one or more than one additional substituent, which may be attached to any position available for additional substituents. The latter are, for example, lower alkyl, e.g. methyl, ethyl, n-propyl, isopropyl, 1,1-dimethyl-propyl, n-butyl, isobutyl, secondary butyl, tertiary butyl and the like, or substituted lower alkyl, such as halogenomethyl, e.g. trifluoromethyl and the like, or N,N-disubstituted amino-methyl, such as N,N-di-lower alkyl-amino-methyl, e.g. N,N-dimethylaminomethyl, N,N-diethyl-aminomethyl and the like, N,N-alkylene-imino-methyl, in which alkylene has from four to seven chain carbon atoms, e.g. 1-pyrrolidinomethyl, 1-piperidinomethyl and the like, 4-lower alkyl-1-piperazino-methyl, e.g. 4-methyl-1-piperazinomethyl and the like, 4-morpholinomethyl, or any other analogous substituted lower alkyl group, such as phenyl-lower alkyl, e.g. benzyl and the like, cycloalkyl having from three to eight, preferably from five to six, ring carbon atoms, e.g. cyclopentyl, cyclohexyl and the like, halogeno, e.g. fluoro, chloro, bromo and the like, or any other suitable substituent, such as R-methoxy having the above-given meaning.

Salts of the compounds of this invention are acid addition salts, such as the pharmaceutically acceptable acid addition salts with inorganic acids, e.g. hydrochloric, hydrobromic, sulfuric, phosphoric acids and the like, or with organic acids, such as organic carboxylic acids, e.g. formic, acetic, propionic, glycolic, malonic, succinic, maleic, hydroxy-maleic, fumaric, malic, tartaric, citric, benzoic, cinnamic, salicylic, 4-aminosalicylic, 2-phenoxy-benzoic, 2-acetoxybenzoic acid and the like, or organic sulfonic acids, e.g. methane sulfonic, ethane sulfonic, 2-hydroxyethane sulfonic, ethane 1,2-disulfonic, benzene sulfonic, p-toluene sulfonic, naphthalene 2-sulfonic acid and the like. Other acid addition salts are used as intermediates, for example, in the purification of the free compounds or in the preparation of other, for example, pharmaceutically acceptable acid addition salts, as well as for identification and characterization purposes. Acid addition salts, which are primarily used for the latter are, for example, those with certain inorganic acids, e.g. perchloric acid and the like, with acidic organic nitro compounds, e.g. picric, picrolonic, flavianic acid and the like, or with metal complex acids, e.g. phosphotungstic, phosphomolybdic, chloroplatinic, Reinecke acid and the like.

The new compounds of this invention have anti-inflammatory properties as demonstrated in the granuloma pouch test (Selye, Proc. Soc. Exp. Biol. & Med., vol. 82, p. 328 (1953), as modified by Robert et al., Acta Endrocrinologica, vol. 25, p. 105 (1957)), the cotton pellet implant test (Meier et al., Experientia, vol. 6, p. 469 (1950)), or the pleural cavity inflammation test (Holtcamp, Fed. Proc., vol. 17, p. 379 (1958)). They are, therefore, useful as anti-inflammatory agents in place of certain corticoid steroids, e.g. cortisone, hydrocortisone and the like, in the treatment of tissue inflammations, such as arthritic inflammations and the like.

Compounds of this invention also have anti-parasite, particularly, taeniacidal (anti-tapeworm) properties, and are, therefore, useful as taeniacides in the treatment of tapeworm infections, caused, for example, by *Hymenolepas nana, Dypilidium canium, Taenia pisiformis* and the like.

Particularly useful are the compounds of the formula:

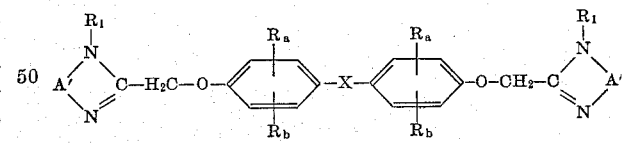

in which X has the previously-given meaning, but is more especially thio of the formula —S—, A' stands for alkylene having from two to three carbon atoms and separating the two nitrogen atoms by from two to three carbon atoms, $R_1$ is primarily hydrogen, as well as lower alkyl, and each of the groups $R_a$ and $R_b$ is hydrogen, lower alkyl or halogeno, or acid addition salts, particularly pharmaceutically acceptable, non-toxic acid addition salts thereof.

The compounds of this invention are useful in the form of compositions for enteral, e.g. oral, parenteral or topical use, which comprise essentially a pharmacologically effective amount of one of the new compounds of this invention in admixture with a pharmaceutically acceptable, organic or inorganic, solid or liquid carrier, the latter usually represents the major portion of the composition. The latter are in solid form, for example, in the form of capsules, tablets, dragees and the like, or in liquid form, for example, in the form of solutions, suspensions, and the like, or in emulsified form, for example, in the form of salves, creams, lotions and the like. For making up the compositions, there are employed substances used in the art of manufacturing pharmaceutical compositions, such as water, gelatin, saccharides, e.g. lactose, glucose and the like, starches, e.g. wheat starch, corn starch and the like, stearic acid or salts thereof, e.g. magnesium stearate, calcium stearate and the like, talc, vegetable oils, benzyl alcohol, stearyl alcohol, cetyl alcohol, petrolatum, gums, acacia, tragacanth, sodium lauryl sulfate, propylene glycol, polyalkylene glycols, or any other carrier materials suitable for making up the compositions. The quantity and the nature of the carrier ingredients can vary widely and depend, inter alia, upon the desired physical appearance or size of the composition, method of manufacture and the like. Encapsulation may be effected by using, if desired, the same excipients as those for tablets. If necessary, the compositions may contain auxiliary substances, such as preserving, stabilizing, wetting, emulsifying, coloring, flavoring agents and the like, salts for varying the osmotic pressure, buffers, etc. The compositions, which are prepared according to known methods, usually by forming mixtures of the pharmacologically active ingredient and the carrier materials, if necessary, granulates for subsequent compression, may also contain, in combination, other useful substances. Any compatible color, approved and certified under the provisions of the Federal Food, Drug and Cosmetic Law may be used for aesthetic purposes or as a means of identification.

The compounds of the present invention are prepared according to known methods, for example, by converting in a compound of the formula $Ar_1^0$—X—$Ar_2^0$, in which X has the previously given meaning, and each of the groups $Ar_1^0$ and $Ar_2^0$ is monocyclic carbocyclic aryl substituted by $R_0$ capable of being converted into R-methoxy, in which R has the previously-given meaning, or a salt thereof, the group $R_0$ into R-methoxy, in which R has the previously-given meaning, and, if desired, converting in a resulting compound the group X into another group representing X, and/or, if desired, converting a resulting salt into the free compound or into another salt, and/or, if desired, replacing in a resulting compound having a hydrogen substituting one of the aza-nitrogen atoms of the 1,3-diaza-2-cycloalken-2-yl radical by lower alkyl, and/or, if desired, converting a free compound into a salt thereof.

The above starting material is more especially represented by the formula $Ar^0$—X—$Ar^0$, in which X has the previously-given meaning, and each of the groups $Ar_0$ represents a monocyclic carbocyclic aryl radical substituted by $R_0$ capable of being converted into R-methoxy, in which R has the previously-given meaning. Groups $R_0$, capable of being converted into R-methoxy, are above all hydroxyl, as well as reactive functionally converted carboxy-methoxy groups.

In a starting material, in which $R_0$ is hydroxyl, such group is converted into R-methoxy, for example, by reacting it or a salt thereof with a reactive ester of an R-methanol, in which R has the previously-given meaning, i.e. is a 1,3-diaza-2-cycloalken-2-yl radical, or a salt thereof.

The salt of a starting material, in which $R_0$ is hydroxyl, primarily a metal salt, particularly an alkali metal, e.g. sodium, potassium and the like, salt, as well as an alkaline earth metal salt thereof, or any other suitable salt. Such salt is prepared according to known methods, for example, by reacting the free starting material with a metal, particularly an alkali metal, or, more especially, with a metal, especially an alkali metal, hydride, amide or lower alkoxide, e.g. methoxide, ethoxide, tertiary butoxide and the like, in the presence of an appropriate diluent.

The reactive esterified R-methanol used as the reagent in the above reaction is above all the ester of such alcohol with a strong inorganic acid, particularly a hydrohalic acid, e.g. hydrochloric acid, hydrobromic acid or hydriodic acid; other suitable esters are those with sulfuric acid, as well as with strong organic acids, particularly strong organic sulfonic acids, such as lower alkane sulfonic acids or monocyclic carbocyclic aryl sulfonic acids, i.e. methane sulfonic, ethane sulfonic, 2-hydroxyethane sulfonic, p-toluene sulfonic acid and the like. Preferred reactive esters of R-methanol are the R-methyl halides, e.g. chloride and the like. Salts of a reactive ester of an R-methanol are addition salts with acids, such as those mentioned before, particularly the hydrohalic acids.

The reaction of the starting material, in which $R_0$ is hydroxyl, more particularly of a salt, especially an alkali metal salt, thereof, with the reactive ester of an R-methanol or a salt thereof is carried out in the absence or in the presence of a diluent; the selection of the latter depends on the properties of the reagents and/or the salt forming reagent. Thus, suitable solvents are, for example, lower alkanols, e.g. methanol, ethanol and the like, ethers, e.g. diethyl ether, p-dioxane, tetrahydrofuran and the like, hydrocarbons, e.g. hexane, cyclohexane, benzene, toluene and the like, N,N-disubstituted amides, e.g. N,N-dimethylformamide and the like, or any other solvent or solvent mixture. The formation of the salt may also be carried out in situ; thus, the starting materials, in which $R_0$ is hydroxyl, may be mixed with the reactive esterified R-methanol or a salt thereof, and the salt-forming reagent, which may also be, for example, an alkali metal carbonate, an alkaline earth metal carbonate and the like, may then be added to the mixture. If necessary, the reaction is carried out while cooling or at an elevated temperature, in a closed vessel and/or in the atmosphere of an inert gas, e.g. nitrogen.

The starting material used in the above procedure is known and prepared according to known methods. Thus, the bis-(monocyclic carbocyclic aryl)-sulfides are obtained, for example, by reacting a phenol compound, such as a compound of the formula $Ar^0$—H, in which $Ar^0$ is a monocyclic carbocyclic aryl radical substituted by $R_0$ representing hydroxyl, with sulfur dichloride in the presence of carbon disulfide. In a resulting bis-(monocyclic carbocyclic aryl)-sulfide, the thio group may be converted into a sulfinyl group or a sulfonyl group according to known oxidation methods; the oxidation of the thio group into a sulfinyl group is carried out by oxidation with hydrogen peroxide in the presence of glacial acetic acid while cooling, with an organic per-acid, e.g. peracetic, perbenzoic, monoperphthalic acid and the like at low temperatures, with chromic acid in the presence of acetic acid and under mild conditions, with nitric acid or any other suitable reagent, whereas its conversion into the sulfonyl group is performed by treatment with hydrogen peroxide or organic peracids at room temperature or preferably at elevated temperatures, with potassium permanganate in the presence of an acid, e.g. acetic, dilute sulfuric acid and the like. Bis-(monocyclic carbocyclic aryl)-sulfoxides may also be obtained by reacting a phenol compound, such as a compound of the formula $Ar^0$—H, in which $Ar^0$ is a monocyclic carbocyclic aryl radical substituted by hydroxyl, with aluminum chloride in the presence of carbon disulfide or thionyl chloride, whereas a bis-(monocyclic carbocyclic aryl)-sulfone may be obtained by reacting the phenol compound with oleum, i.e. concentrated sulfuric acid containing sulfur trioxide. A resulting bis-(monocyclic carbocyclic aryl)-sulfoxide may be converted into the corresponding sulfide compound by reduction, for example, with zinc and acetic acid or any other suitable reduction procedure.

As noted above, the group $R_0$ capable of being converted into R-methoxy is also a reactive functionally converted carboxy-methoxy group. The reactive functionally converted carboxyl portion of such group is primarily a cyano group, as well as an imido-ether, an imido-thioether, an imido-halide, an amidino, an amido, a thio-amido, and ester, or an acid halide grouping. These groups are represented by the formula:

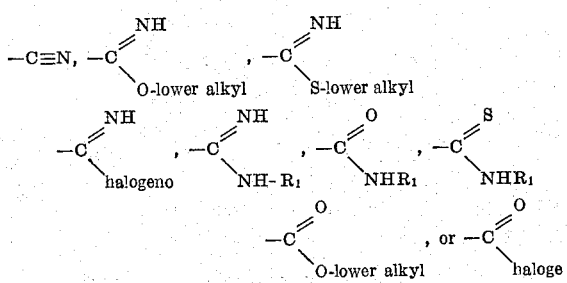

in which halogeno stands primarly for chloro, as well as bromo and the like, and $R_1$ has the above-given meaning, i.e. stands for hydrogen or lower alkyl.

The conversion of a reactive functionally converted carboxyl group into the desired 1,3-diaza-2-cycloalken-2-yl radical is carried out according to known methods. For example, the starting material is reacted with a lower alkylene diamine, in which the two amino groups are separated by two to four carbon atoms, or with a compound capable of being converted into such lower alkylene diamine by treatment with ammonia, or with a reactive N-substituted derivative of such lower alkylene diamine. The desired ring formation is carried out directly or in stages, if necessary, in the presence of a suitable reagent; furthermore, the process may be performed in such manner that a functional acid derivative is formed in the course of the reaction.

For example, whenever the preferred starting material, in which $R_0$ is cyanomethoxy, is reacted directly with the lower alkylene diamine or with a derivative thereof, it is of advantage to perform the reaction in the presence of hydrogen sulfide, carbon disulfide and the like; in such reaction, the lower alkylene diamine may be used in the form of a salt thereof.

Compounds capable of being converted into a lower alkylene diamine by the reaction with ammonia, are, for example, the corresponding hydroxy-lower alkyl-amines, or especially the esters thereof, as well as lower alkylene halides. Using these starting materials, the reaction is carried out in the presence of ammonia or an agent yielding ammonia.

Reactive N-substituted derivatives of the lower alkylene diamines used as reagents in the above process are ureas, such as, for example, ethylene urea, propylene urea and the like.

To carry out the procedure in stages, the starting material is reacted with the lower alkylene diamine to form the N-acyl compound, which is then ring-closed by elimination of water, for example, by using a dehydrating agent, such as calcium oxide and the like, or by desulfurization, for example, with a heavy metal oxide and the like.

The above reaction is carried out according to known methods; conditions depend largely on the choice of the starting material and the reagent. Thus, the reaction may be carried out in the absence or presence of a diluent, catalyst and/or condensing agent, if necessary, while cooling or at an elevated temperature, under increased pressure, and/or in the atmosphere of an inert gas, such as nitrogen. By-products, formed during the reaction, such as water, may be removed, for example, by azeotropic distillation. Furthermore, one of the reactants may be used in excess of the other.

The starting materials used in the above procedure are prepared according to known methods. For example, the salt of a compound of the formula $Ar_1^0$—X—$Ar_2^0$, in which X has the previously-given meaning, and each of the monocyclic carbocyclic aryl groups $Ar_1^0$ and $Ar_2^0$ is substituted by hydroxyl, particularly a compound of the formula $Ar^0$—X—$Ar^0$, in which X has the previously-given meaning, and each of the groups $Ar^0$ is monocyclic carbocyclic aryl substituted by hydroxyl, may be treated with a reactive esterified hydroxy-acetic acid or a reactive functionally converted acid derivative thereof. This reaction is carried out in a manner analogous to the one previously described, involving treatment of a starting material of the formula $Rr_1^0$—X—$Ar_2^0$, in which X has the previously-given meaning, and each of the monocyclic carbocyclic aryl groups is substituted by hydroxyl, or a salt thereof, with a reactive ester of an R-methanol or a salt thereof. In any resulting compound a free carboxyl group or a reactive functionally converted carboxyl group may be converted into the desired reactive functionally converted carboxyl group according to methods known per se. Furthermore, in a resulting starting material, a group X may be converted into another group representing X according to known methods, for example, those previously described.

In a resulting compound, in which one of the nitrogen atoms of the 1,3-diazo-2-cycloalken-2-yl radical representing R carries a hydrogen, such hydrogen may be replaced by lower alkyl according to known methods. For example, a resulting compound of the formula

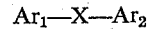

in which X has the previously-given meaning, and in at least one of the two R-methoxy-substituted monocyclic carbocyclic aryl groups the group R is an N-unsubstituted 1,3-diaza-2-cycloalken-2-yl radical, or a salt thereof, such as an alkali metal salt thereof, may be reacted with a reactive ester of a lower alkanol, for example, a lower alkyl halide, e.g. methyl, ethyl or isopropyl chloride, bromide, or iodide and the like, or a di-lower alkyl sulfate, e.g. dimethyl sulfate, diethyl sulfate and the like, to yield the corresponding compound of the formula $Ar_1$—X—$Ar_2$, in which X has the previously-given meaning, and at least one of the monocyclic carbocyclic aryl groups $Ar_1$ and $Ar_2$ is substituted with an N-lower alkylated (1,3-diaza-2-cycloalken-2-yl)-methoxy group.

In a resulting compound of the formula $Ar_1$—X—$Ar_2$, in which $Ar_1$, $Ar_2$ and X have the previously-given meaning, a group X may be converted into another group representing X. This conversion is carried out according to known methods, such as those previously described; in the oxidation of a thio group into a sulfinyl or sulfony group those oxidation reagents are preferred, which do not favor the formation of oxidative degradation products.

A resulting acid addition salt may be converted into the free compound, for example, by treatment with an alkaline reagent, such as a metal hydroxide, e.g. sodium hydroxide, potassium hydroxide, calcium hydroxide and the like, a metal carbonate, e.g. sodium, potassium or calcium carbonate or hydrogen carbonate or hydrogen carbonate and the like, ammonia or any other alkaline reagent, as well as a suitable hydroxyl ion exchange preparation, etc.

A resulting acid addition salt may be converted directly into another acid addition salt, for example, by treatment with an anion exchange preparation. Furthermore, conversion of one acid addition salt into another may also be achieved, for example, by reacting an inorganic acid addition salt with a suitable metal, e.g. sodium, barium silver and the like, salt of an acid, in a diluent, in which resulting inorganic salt is insoluble and is thus removed from the reaction medium.

A free compound may be converted into an acid addition salt by reacting it or a solution thereof in a suitable solvent or solvent mixture with an acid, such as one of those described before, or a solution thereof, or with suitable anion exchange preparation, and isolating the desired salt. A salt may be obtained in the form of a hydrate or may contain solvent of crystallization.

The invention also comprises any modification of the process wherein a compound formed as an intermediate at any stage of the process, is used as starting material and the remaining step(s) of the process is(are) carried out, or the process is discontinued at any stage, or i which the starting materials are formed in the course of the reaction. Also included within the scope of the present invention are any new intermediates, such as, for example, those mentioned hereinbefore.

In the process of this invention such starting materials are preferably used which lead to final products mentioned in the beginning as preferred embodiments of the invention.

The following examples are intended to illustrate the invention and are not to be construed as being limitations hereon. Temperatures are given in degrees centigrade.

*Example 1*

To a solution of 10.8 g. of bis-(4-hydroxy-2-methyl-5-tertiary butyl-phenyl)-sulfide in 30 ml. of N,N-dimethyl-formamide and 50 ml. of toluene is added 2.7 g. of a 53 percent suspension of sodium hydride in mineral oil while stirring and maintaining at atmosphere of nitrogen. After stirring for ten minutes, a solution of 8.5 g. of 2-chloromethyl-2-imidazoline in 110 ml. of toluene is added, and the reaction mixture is heated to 50° and maintained at that temperature for eight hours. After standing overnight, the solution is filtered, and the solid material is washed with benzene and N,N-dimethylformamide, then slurried with water and recrystallized from ethyl acetate to yield filtrate is acidified with a solution of hydrogen chloride in ethyl acetate, and the resulting precipitate is filtered off. After washing with isopropanol and two recrystallizations from a mixture of ethanol and ethyl acetate, this second crop of the bis-[4-(2-imidazolin-2-yl-methyl)-oxy-2-methyl-5-tertiary butyl-phenyl]-sulfide dihydrochloride, M.P. 285° (yield: 3.5 g.), is combined with the first crop and is recrystallized from a mixture of ethanol and ethyl acetate; the resulting product melts at 288°.

The bis-[4-(2-imidazolin-2-yl-methyl)-oxy-2-methyl-5-tertiary butyl-phenyl]-sulfide picrate is prepared by reacting bis-[4-(2-imidazolin-2-yl-methyl)-oxy-2-methyl-5-tertiary butyl-phenyl]-sulfide with picric acid in an appropriate solvent.

Upon reacting bis-[4-(2-imidazolin-2-yl-methyl)-oxy-2-methyl-5-tertiary butyl-phenyl]-sulfide with an excess of methyl iodide, the bis-[4-(1-methyl-2-imidazolin-2-yl-methyl)-oxy-2-methyl-5-tertiary butyl-phenyl]-sulfide dihydroiodide is obtained.

*Example 2*

Other compounds of this invention, which are prepared according to the above described and illustrated procedure by selecting the appropriate starting materials, are, for example,

| Starting Material | Reagent | Product |
|---|---|---|
| s-(4-hydroxy-phenyl)-sulfide | 2-chloromethyl-2-imidazoline plus NaH | Bis-[4-(2-imidazolin-2-yl-methyl)-oxyphenyl]-sulfide. |
| s-(4-hydroxy-phenyl)-sulfide | 2-chloromethyl-1,4,5,6-tetra-hydro-pyrimi-dine plus NaH | Bis-[4-(1,4,5,6-tetrahydro-pyrimidin-2-yl-methyl)-oxy-phenyl]-sulfide. |
| s-(4-hydroxy-2-methyl-5-tertiary butyl-phenyl)-sulfide | ___do___ | Bis-[2-methyl-5-tertiary butyl-4-(1,4,5,6-tetrahydro-pyrimidin-2-yl-methyl)-oxy-phenyl]-sulfide. |
| hydroxy-phenyl)-(4-hydroxy-3-methyl-phenyl)-sulfide | 2-chloromethyl-2-imidazoline plus NaH | [4-(2-imidazolin-2-yl-methyl)-oxy-phenyl]-[4-(2-imidazolin-2-yl-methyl)-oxy-3-methyl-phenyl]-sulfide. |
| s-(3-cyclohexyl-4-hydroxy-5-methyl-phenyl)-sulfide | ___do___ | Bis-[3-cyclohexyl-4-(2-imidazolin-2-yl-methyl)-oxy-5-methylphenyl]-sulfide. |
| s-(2,6-dibenzyl-4-hydroxy-phenyl)-sulfide | 2-chloromethyl-4-methyl-2-imidazoline plus NaH | Bis-[2,6-dibenzyl-4-(4-methyl-2-imidazolin-2-yl-methyl)-oxyphenyl]-sulfide. |
| s-(2,6-di-isopropyl-4-hydroxy-phenyl)-sulfide | 2-chloromethyl-2-imidazoline plus NaH | Bis-[2,6-di-isopropyl-4-(2-imidazolin-2-yl-methyl)-oxy-phenyl]-sulfide. |
| s-(3,5-dichloro-4-hydroxy-phenyl)-sulfide | ___do___ | Bis-[3,5-dichloro-4-(2-imidazolin-2-yl-methyl)-oxy-phenyl]-sulfide. |
| s-(2,6-dichloro-4-hydroxy-phenyl)-sulfide | 2-chloromethyl-1,3-diaza-2-cycloheptene plus NaH | Bis-[2,6-dichloro-4-(1,3-diaza-2-cyclohepten-2-yl-methyl)-oxy-phenyl]-sulfide. |
| s-(2-ethyl-4-hydroxy-phenyl)-sulfide | 2-chloromethyl-1,4,5,6-tetra-hydro-pryimidine plus NaH | Bis-[2-ethyl-4-(1,4,5,6-tetrahydro-2-pyrimidin-2-yl-methyl)-oxy-phenyl]-sulfide. |
| s-(2-N,N-diethyl-aminomethyl-3,6-dimethyl-4-hydroxy-phenyl)-sulfide | 2-chloromethyl-2-imidazoline plus NaH | Bis[2-N,N-diethylamino-methyl-3,6-dimethyl-4-(2-imidazolin-2-yl-methyl)-oxy-phenyl]-sulfide. |
| s-(4-hydroxy-2,3,5,6-tetramethyl-phenyl)-sulfide | ___do___ | Bis-[4-(2-imidazolin-2-yl-methyl)-oxy-2,3,5,6-tetramethylphenyl)-sulfide. |
| s-(3-bromo-2-chloro-4-hydroxy-phenyl)-sulfide | 2-chloromethyl-1,4,5,6-tetra-hydro-pyrimidine plus NaH | Bis-[3-bromo-2-chloro-4-(1,4,5,6-tetrahydro-pyrimidin-2-yl-methyl)-oxy-phenyl]-sulfide. |
| s-(4-hydroxy-phenyl)-sulfoxide | 2-chloromethyl-2-imidazoline plus NaH | Bis-[4-(2-imidazolin-2 yl-methyl)-oxy-phenyl]-sulfoxide. |
| s-(4-hydroxy-2-methyl-5-tertiary butyl-phenyl)-sulfoxide | ___do___ | Bis-[4-(2-imidazolin-2-yl-methyl)-oxy-2-methyl-5-tertiary butyl-phenyl]-sulfoxide. |
| s-(4-hydroxy-phenyl)-sulfone | ___do___ | Bis [4-(2-imidazolin-2-yl-methyl)-oxy-phenyl]-sulfone. |
| s-(4-hydroxy-2-methyl-5-tertiary butyl-phenyl)-sulfone | ___do___ | Bis-[4-(2-imidazolin-2-yl-methyl)-oxy-2-methyl-5-tertiary butyl-phenyl]-sulfone. |
| s-(3,4-dihydroxy-phenyl)-sulfide | ___do___ | Bis-[3,4-bis-(2-imidazolin-2-yl-methyl)-oxy-phenyl]-sulfide. | the bis-[4-(2-imidazolin-2-yl-methyl)-oxy-2-methyl-5-tertiary butyl-phenyl]-sulfide of the formula:

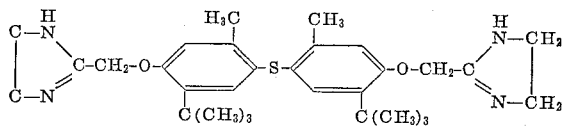

which melts at 192–195°. The bis-[4-(2-imidazolin-2-yl-methyl)-oxy-2-methyl-5-tertiary butyl-phenyl]-sulfide dihydrochloride is obtained by dissolving the bis-[4-(2-imidazolin-2-yl-methyl)-oxy-2-methyl-5-tertiary butyl-phenyl]-sulfide in isopropanol and adding a solution of hydrogen chloride in ethyl acetate, and cooling; the resulting salt melts at 285° (with decomposition); yield: 4.9 g.

The filtrate obtained after removing the bis-[4-(2-imidazolin-2-yl-methyl)-oxy-2-methyl-5-tertiary butyl-phenyl]-sulfide is concentrated under reduced pressure, and the residue is taken up in ethyl acetate. After filtering, the

What is claimed is:
1. A member selected from the group consisting of the compound having the formula:

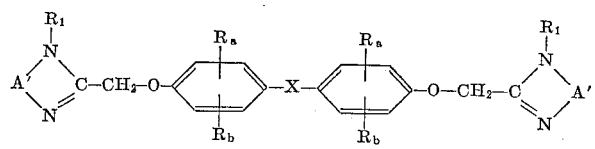

in which X is a member selected from the group consisting of thio, sulfinyl and sulfonyl, A' is alkylene of from two to three carbon atoms and separating the two nitrogen atoms by two to three carbon atoms, $R_1$ is a member selected from the group consisting of hydrogen and lower alkyl, and each of the groups $R_a$ and $R_b$ is a member selected from the group consisting of hydrogen, lower alkyl and halogeno, and an acid addition salt thereof.

2. A member selected from the group consisting of the compound having the formula:

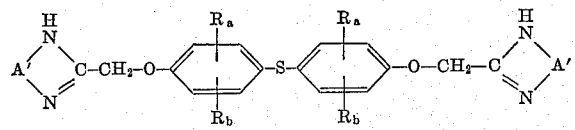

in which A′ is alkylene of from two to three carbon atoms and separating the two nitrogen atoms by two to three carbon atoms, and each of the groups $R_a$ and $R_b$ is a member selected from the group consisting of hydrogen, lower alkyl and halogeno, and an acid addition salt thereof.

3. Bis - [4-(2-imidazolin-2-yl-methyl)-oxy-2-methyl-5-tertiary butyl-phenyl]-sulfide.

4. An acid addition salt of bis-[4-(2-imidazolin-2-yl-methyl)-oxy-2-methyl-5-tertiary butyl-phenyl]-sulfide.

5. Bis - [4-(2-imidazolin-2-yl-methyl)-oxy-2-methyl-5-tertiary butyl-phenyl]-sulfide dihydrochloride.

References Cited

Cavallini, Chemical Abstracts, vol. 41, column 6989 (1947).

Passerini et al.: Gazz. Chim. Ital., vol. 90, page 1279 relied on (1960).

WALTER A. MODANCE, *Primary Examiner.*

JOHN D. RANDOLPH, *Examiner.*

N. TROUSOF, *Assistant Examiner.*